United States Patent [19]
Fuchsreiter et al.

[11] Patent Number: 5,544,314
[45] Date of Patent: Aug. 6, 1996

[54] HIERARCHICAL NETWORK MANAGEMENT SYSTEM

[75] Inventors: Johannes Fuchsreiter, Nürnberg; Konrad Schmidt, Ellingen; Rudolf Kasseckert, Nürnberg; Walter Neumann, Eckental, all of Germany

[73] Assignee: Lucent Technologies Inc., Murray Hill, N.J.

[21] Appl. No.: 531,571

[22] Filed: Sep. 7, 1995

Related U.S. Application Data

[63] Continuation of Ser. No. 957,577, Oct. 7, 1992, abandoned.

[30] Foreign Application Priority Data

Oct. 9, 1991 [DE] Germany ............................ 41 33 385.3

[51] Int. Cl.$^6$ ........................................................ G06F 13/00
[52] U.S. Cl. .................. 395/200.0; 370/56; 364/229.41; 364/940.92; 364/DIG. 1
[58] Field of Search ............................... 370/56; 395/200

[56] References Cited

U.S. PATENT DOCUMENTS

| | | | |
|---|---|---|---|
| 3,728,492 | 4/1973 | Cappetti et al. ............................ | 370/56 |
| 4,347,498 | 8/1982 | Lee et al. ............................ | 340/825.02 |
| 4,545,013 | 10/1985 | Lyon et al. ............................ | 371/20.1 |
| 4,726,017 | 2/1988 | Krum et al. ............................ | 370/85.8 |
| 4,801,934 | 1/1989 | Herkert ............................ | 340/835.02 |
| 4,955,015 | 9/1990 | Lobjinski et al. ............................ | 370/56 |
| 5,084,870 | 1/1992 | Hutchison et al. ............................ | 370/94.1 |
| 5,099,473 | 3/1992 | Gupta et al. ............................ | 370/56 |
| 5,222,062 | 6/1993 | Sharma et al. ............................ | 370/56 |
| 5,241,540 | 8/1993 | Ocheltree ............................ | 370/85.12 |
| 5,379,291 | 1/1995 | Herzberg et al. ............................ | 370/85.5 |

FOREIGN PATENT DOCUMENTS 0123132   3/1984   European Pat. Off. .

OTHER PUBLICATIONS

Phillips Kommunikations Industrie AG; SISA Kommunikationsnetz fur Netmanagement; Mar. 1991.
Stallings, Data and Computer Communication, 1991 pp. 148–170.
CCITT Recommendation M.30 (M.3010, M.3020, M.3100, M.3180, M.3200, M.3300 and M.3400).

*Primary Examiner*—Parshotam S. Lall
*Assistant Examiner*—Kenneth R. Coulter
*Attorney, Agent, or Firm*—Christopher N. Malvone

[57] ABSTRACT

A hierarchical network management system is described which includes concentrators (2A to 5A) on the individual levels (E1 to E3) of the hierarchy as well as adjustable interfaces in the concentrators for point-to-point and bus connections. An interface is provided for a bus connection on a master side. The interface takes delays into consideration. A transmission channel can be connected to the interface. The channel includes a forward bus and return line (a5, b5). Parallel addressable apparatus (8A, 8B, 8C) can be connected to the forward and return lines. A controllable change-over switch (A8, B8, C8), inserted in the return line (b5) of the transmission channel, is provided for each addressable apparatus (8A, 8B, 8C) of the parallel combination.

2 Claims, 1 Drawing Sheet

HIERARCHICAL NETWORK MANAGEMENT SYSTEM

This is a continuation of application Ser. No. 07/957,577 filed OCT. 7, 1992 now abandoned.

BACKGROUND OF THE INVENTION

1. Field of the Invention

The invention relates to a hierarchical network management system comprising:

1a) concentrators between the separate levels of the hierarchy and 1b) interfaces in the concentrators for point-to-point and bus connections.

2. Description of the Related Art

A management system having these characteristic features is provided, for example, in the CCITT Recommendation M.30 (cf. the Blue Book), which will be referenced as (D1) in the following. Concretizations of such management systems are described, for example, in DE 34 36 44 1 A1 and in a data paper of Philips Kommunikations Industrie AG (SISA Kommunikationsnetz für Netzmanagement, March 1991). These two documents will be referenced (D2) and (D3) in the following.

Specifically for the management system according to (D3) it holds that the network elements to be monitored are to comprise a serial interface via which the messages from the network elements within the system are transmitted to network monitoring positions. Since all the lines of the system are bidirectional, control instructions and also user data can be transmitted to the network elements to be monitored. The network observation desk at which the messages of all the network elements to be monitored come together, is to be called a central observation desk here.

The user of an information transmission network has, aided by such a management system, the possibility of continuously providing himself with an idea of the state of his transmission network by evaluating the protocols arriving at the central observation desk. This idea includes, for example, differentiated reports on malfunctionings of the transmission network as well as on the quality of the transmission. On the basis of this information the network user may then timely and purposefully take measures, for example, utilize a substitute circuit, so that always optimum use is made of the capacity of his transmission network.

The communication of the management system according to (D3) is based on the so-called master-slave principle. Up to thirty concentrators or network elements can be connected as slaves to a master concentrator. The master interrogates his slaves for telegrams with the aid of addresses and transfers these telegrams to the concentrator or the network observation desk by which he is interrogated himself by means of an address.

In this manner there is a hierarchical structure which is subdivided into so-called addressing levels. This hierarchical structure is called tree structure in (D2). On an addressing level—called level for short—there is a concentrator as master which interrogates at least two connected apparatus by way of addresses. An apparatus is here to be understood as either a network element or a concentrator. A network element is a component of the transmission network to be monitored.

A disadvantage in the SISA system described in (D3) is the fact that the number of levels is limited to ten. As a result, a maximum of five network elements of the line structure such as, for example, the intermediate regenerators of a transmission section, can be monitored by the system. Connecting intermediate regenerators via a bus interface having the electrical properties as stated in V.11 (cf.(D3)) to a concentrator is impossible.

Point-to-point connections by which larger distances can be bridged, however, are only provided for interconnecting the concentrators. For this purpose, two concentrators should be installed at each intermediate regenerator. One concentrator connected via a point-to-point connection to the concentrator of the next higher level and which furthermore comprises a bus connection to which a second concentrator and the intermediate regenerator are connected. The second concentrator is connected via a point-to-point connection to the first concentrator of the next intermediate regenerator. The number of permitted levels would then be reached with the fifth intermediate regenerator at the latest.

SUMMARY OF THE INVENTION

It is an object of the invention to eliminate the depicted disadvantage in known systems of the type mentioned in the opening paragraph with the least possible circuitry and cost. This object is achieved by means of the following measures:

1c) an interface for a bus connection on the master side, which takes delays into consideration and to which a transmission channel can be connected, which channel comprises a forward and a return line and to whose line apparatus addressable in parallel are connected, 1d) a controllable change-over switch inserted in the return line of the transmission channel and provided for each addressable apparatus of the parallel combination.

BRIEF DESCRIPTION OF THE DRAWINGS

The FIGURE illustrates a hierarchial network management system according to the invention.

DESCRIPTION OF THE PREFERRED EMBODIMENTS

Figure 1:
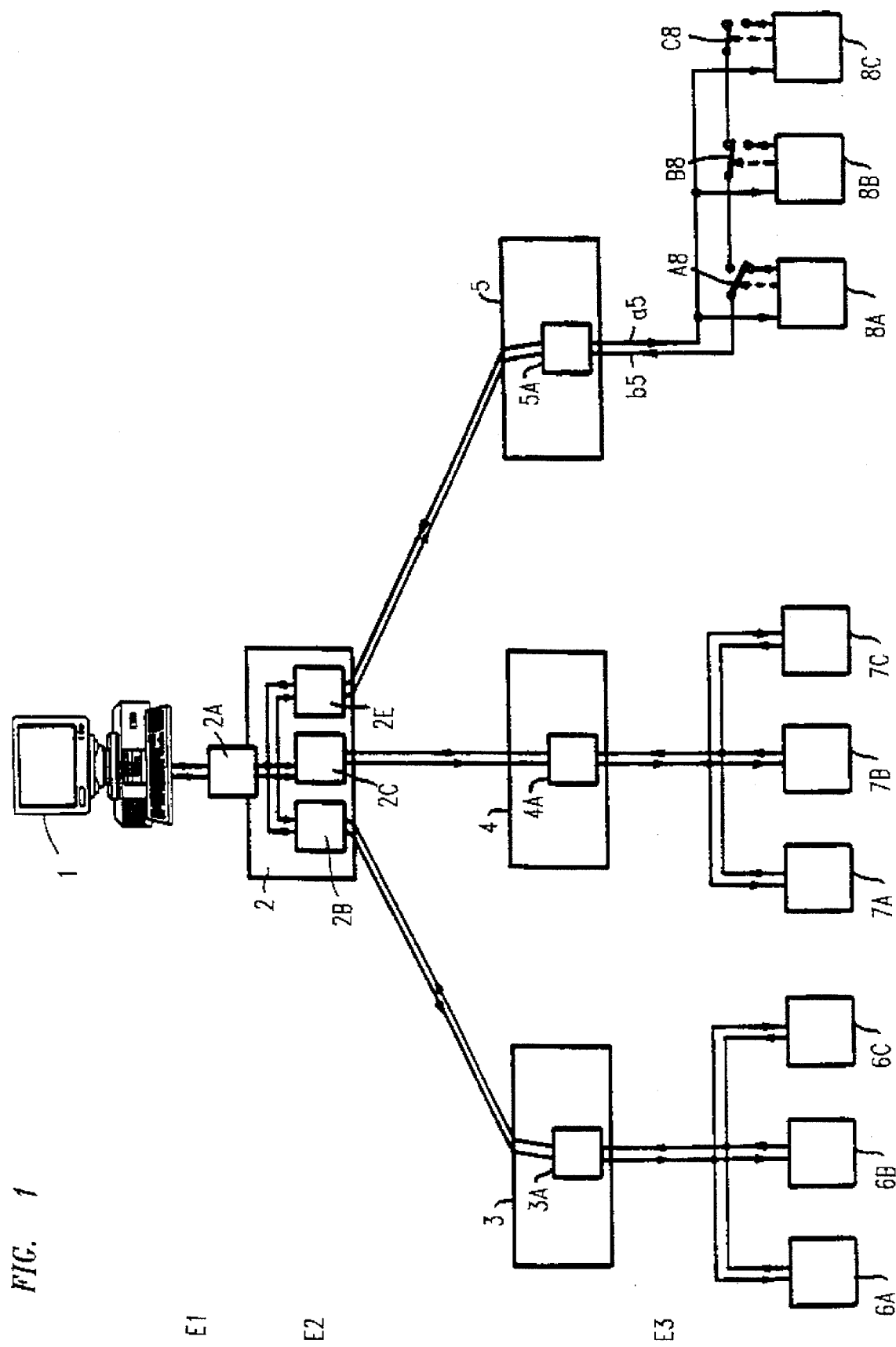

According to the invention a concentrator e.g. of the system according to (D3) needs to be extended only by one (adjustable) interface for a bus connection which also takes delays into consideration. This extension can be realised only by means of a software modification in present day state of the art technology.

Transmission sections whose intermediate regenerators are to be monitored by the management system according to the invention usually have a bidirectional channel for the monitoring, as shown in, for example, EP 01 23 132 B1. In such a transmission section the intermediate regenerators could be provided only with a controllable change-over switch in the transmission line of the channel, so that, when data are transmitted, this operation cannot be disturbed by other apparatus.

A dependent claim is focused on a concentrator for the system according to the invention, a further dependent claim on a network element which is to be monitored by the system according to the invention.

An exemplary embodiment of the invention will be further explained with reference to the drawing Figure.

The system as shown in the Figure has only one observation desk i.e. the central observation desk 1. It comprises a total of three levels E1, E2 and E3. On the levels there are concentrators 2A, 2B, 2C and 2E as well as network elements 6A, 6B, 6C, 7A, 7B, 7C, 8A, 8B and 8C. Integrated in the network elements are the necessary interfaces which make the data exchange with the connected concentrators possible. Basically, the network elements may also be replaced by concentrators. The concentrators 2B, 2C, 2E, 3A, 4A and 5A belong to the same level, because the concentrators 2B, 2C and 2E have each only one slave which is connected on their master side.

The concentrators themselves are printed circuit boards having adjustable interfaces. For example, at the concentrator 2A on its slave side an interface is inserted for a point-to-point connection, whereas on its master side an interface is inserted for a bus connection. More precise details about the interfaces can be found in (D3).

With the concentrators 2B, 2C and 2E the reverse is true: on their slave side an interface is inserted for a bus connection whereas on their master side there is an interface for point-to-point connection. The interfaces of the concentrators 3A, 4A and 5A are adjusted, so that they make a point-to-point connection on the slave side possible. On the master side, the interfaces are arranged so that the concentrators 3A and 4A can be connected to the addressable network elements by way of a bus connection, whereas on the master side of the concentrator 5A a bus interface is inserted which makes the connection of a transmission channel a5, b5 possible which may have an arbitrary length. The transmission channel may have arbitrary length, because the inserted interface takes the delays on the channel into consideration. The connected network elements are to contain a specific interface whose main constituent part comprises a control (not shown) as well as a controllable switch A8, B8 and C8. The controllable change-over switch is situated in the return line of the transmission channel and is activated when the network element concerned has recognized its address which has been transmitted by the concentrator 5A. In this case the switch is moved so that the network element now transmitting is the only network element connected to the return line b5 of the transmission channel. Basically, the network elements 8A, 8B and 8C may alternatively be concentrators to which again by known bus connections further network elements are connected.

All the concentrators of the system shown in the drawing Figure are arranged so that interfaces can be inserted on their master side and slave side, which interfaces are structured as the interfaces of the network elements 8A, 8B, 8C or the interfaces on the master side of the concentrator 5A. How an interface according to the details brought forward can be concretized can be learnt from the stated literature by those skilled in the art.

What is claimed is:

1. A hierarchical network management system for managing a hierarchical network of individual levels of network elements to be monitored, said network management system comprising:

a hierarchical network of components arranged in a hierarchy, said network having concentrators for separating individual levels of the hierarchy, each concentrator further having a slave side and a master side;

a central observation desk for monitoring a desired one of the network elements to be monitored by means of an address and for receiving a protocol from the network element so monitored;

at least one concentrator in the hierarchy having an interface on a master side thereof, wherein said interface is adjusted for a bus connection;

a transmission channel of arbitrary length connected to said interface, wherein said transmission channel comprises a forward line and a return line, further wherein said interface takes delays on said transmission channel of arbitrary length into consideration;

a plurality of parallel addressable apparatus connected in parallel to the forward and return lines of said transmission channel, wherein said parallel addressable apparatus comprise the network elements to be monitored and further wherein the combination of said transmission channel, said plurality of parallel addressable apparatus, and said interface constitutes the bus connection; and a plurality of controllable change-over switches inserted in the return line of said transmission channel, wherein a controllable change-over switch is provided for each of said parallel addressable apparatus for selectively connecting a desired one of said plurality of parallel addressable apparatus to the return line, further wherein each controllable change-over switch is responsive to, that is, controlled by, an activation by a respective parallel addressable apparatus to which the controllable change-over switch is connected for changing over said respective parallel addressable apparatus from (i) being not connected, to (ii) being connected, to the return line of said transmission channel and further for being the only parallel addressable apparatus connected to the return line of said transmission channel, still further wherein the activation by a parallel addressable apparatus comprises a recognition by the parallel addressable apparatus of its address, the address having been transmitted by said at least one concentrator, further having been initially transmitted by said central observation desk.

2. The system as claimed in claim 1, wherein said parallel addressable apparatus further comprise at least one additional concentrator, said additional concentrator having an interface on a slave side thereof, wherein the controllable change-over switch connected therewith is controlled by means of an address for said additional concentrator.

* * * * *